(12) United States Patent
Simpson et al.

(10) Patent No.: US 9,967,390 B2
(45) Date of Patent: May 8, 2018

(54) DEVICE-ORIENTATION CONTROLLED SETTINGS

(71) Applicant: Google LLC, Mountain View, CA (US)

(72) Inventors: Robert John Simpson, Milton Keynes (GB); Richard Henry Penda Seward, London (GB)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 15/251,257

(22) Filed: Aug. 30, 2016

(65) Prior Publication Data

US 2018/0063317 A1    Mar. 1, 2018

(51) Int. Cl.
*H04M 3/00* (2006.01)
*H04M 1/725* (2006.01)

(52) U.S. Cl.
CPC ... *H04M 1/72569* (2013.01); *H04M 1/72561* (2013.01); *H04M 1/72572* (2013.01)

(58) Field of Classification Search
CPC .......................... H04M 1/72569; H04W 8/245
USPC ...................................... 455/418, 414.1, 566
See application file for complete search history.

(56) References Cited

U.S. PATENT DOCUMENTS

| | | |
|---|---|---|
| 2008/0062134 A1 | 3/2008 | Duarte et al. |
| 2008/0168349 A1 | 7/2008 | Lamiraux et al. |
| 2010/0030549 A1* | 2/2010 | Lee ................ G06F 1/1626 704/4 |
| 2011/0070895 A1* | 3/2011 | Ichinose ............ H04M 1/2745 455/456.1 |
| 2013/0235073 A1* | 9/2013 | Jaramillo ............ G09G 5/00 345/619 |
| 2014/0320536 A1 | 10/2014 | Mok et al. |
| 2016/0077729 A1 | 3/2016 | Woo et al. |

FOREIGN PATENT DOCUMENTS

| | | |
|---|---|---|
| EP | 2224323 | 9/2010 |
| WO | 2012/078654 | 6/2012 |
| WO | 2015/191468 | 12/2015 |

OTHER PUBLICATIONS

International Search Report and Written Opinion issued in International Application No. PCT/US2017/045297, dated Oct. 9, 2017, 18 pages.

\* cited by examiner

*Primary Examiner* — Chuck Huynh
(74) *Attorney, Agent, or Firm* — Fish & Richardson P.C.

(57) ABSTRACT

Methods, systems, and apparatus, including computer programs encoded on a computer storage medium, relating to changing device settings based on an orientation or motion of a mobile device. The method includes receiving a user input, determining that the mobile device was oriented in a first orientation when the user input was received, selecting a first device setting or service request parameter that affects a mobile phone application or a web service experience and that are associated with the first orientation, providing, for output at the mobile device, a first response to the user input based on the first device setting, after providing the first response to the user input, determining that the mobile device has been reoriented in a different, second orientation, selecting a second device setting, and providing a second response to the user input, or to a revision of the user input, based on the second device setting.

20 Claims, 7 Drawing Sheets

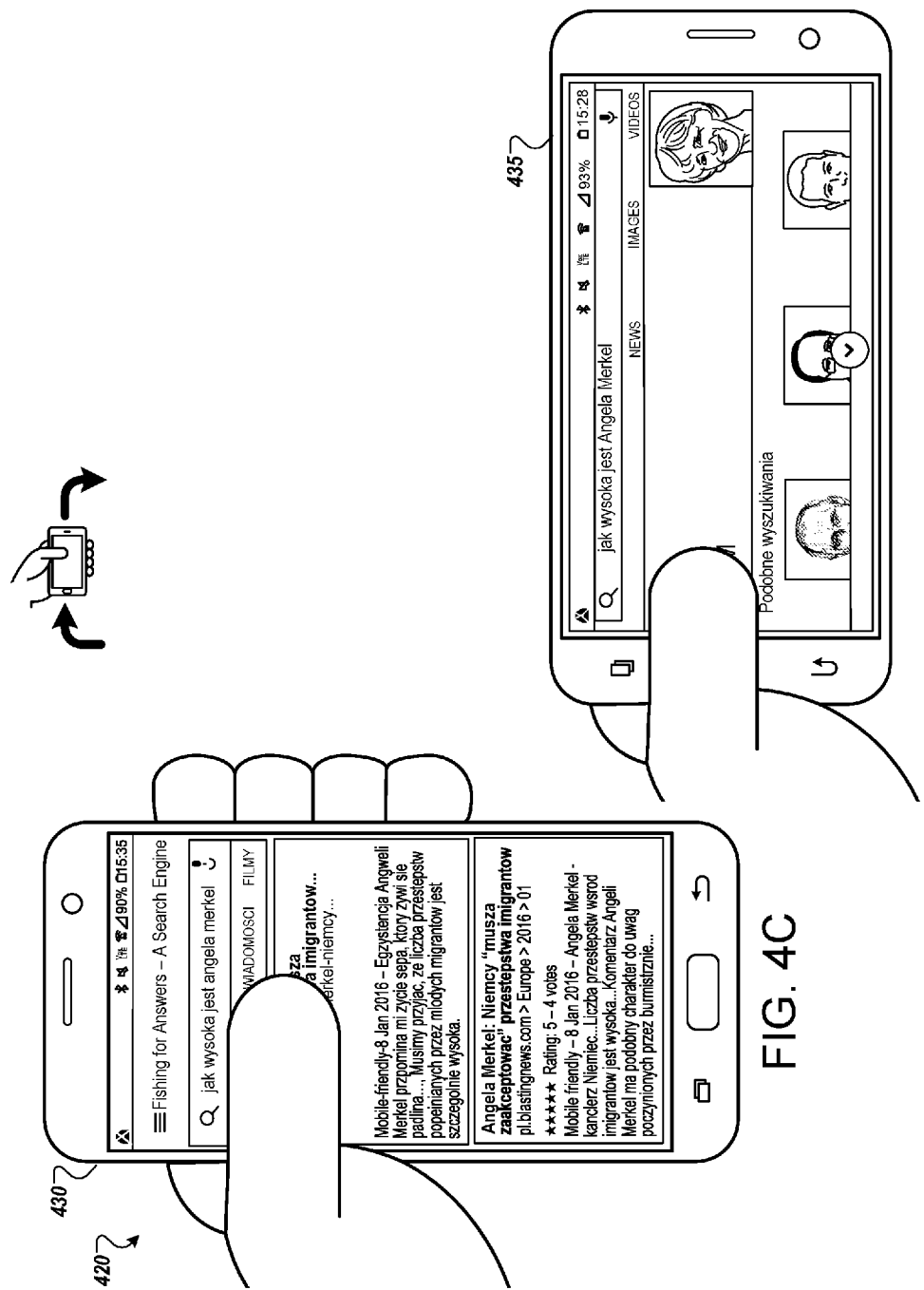

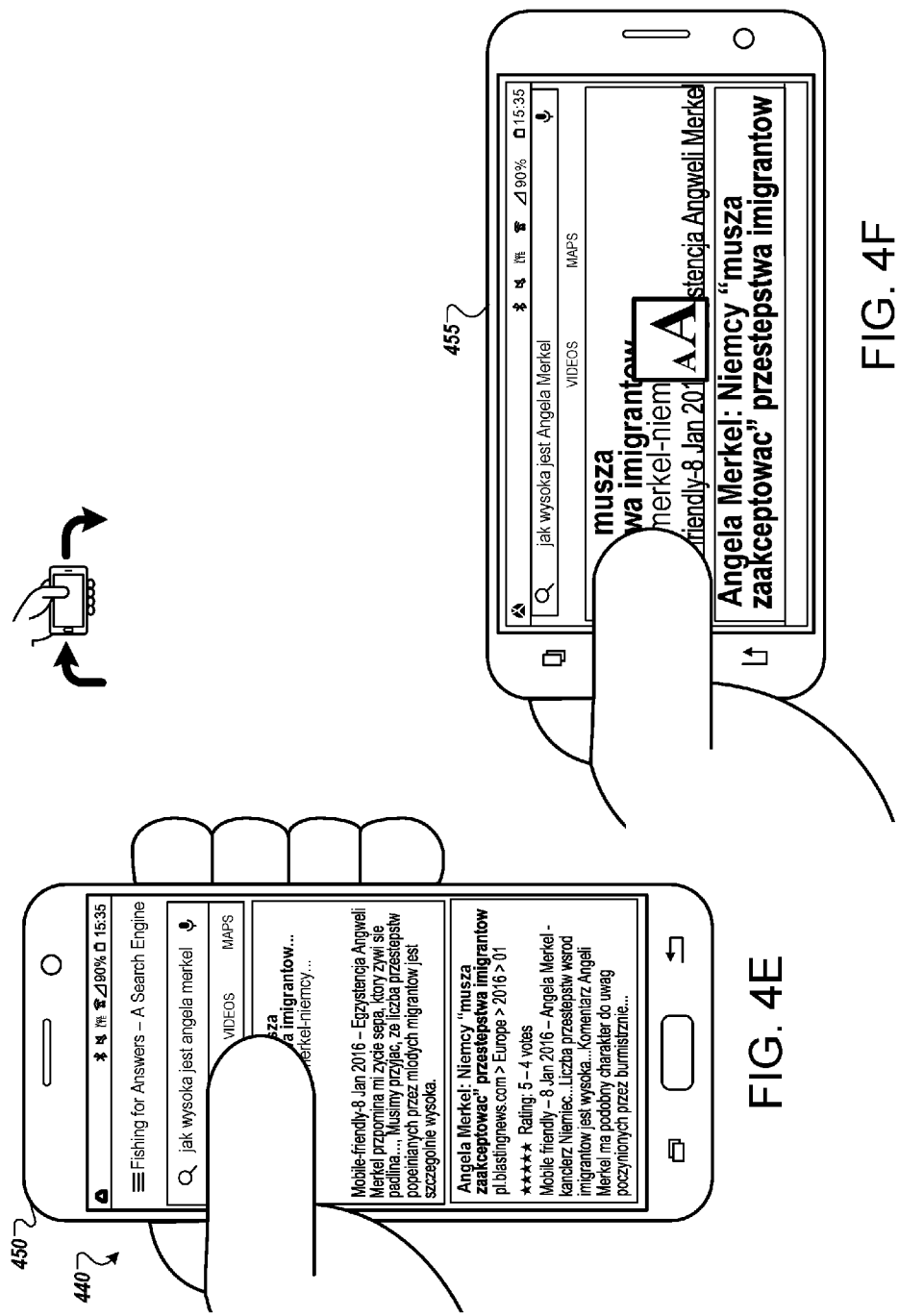

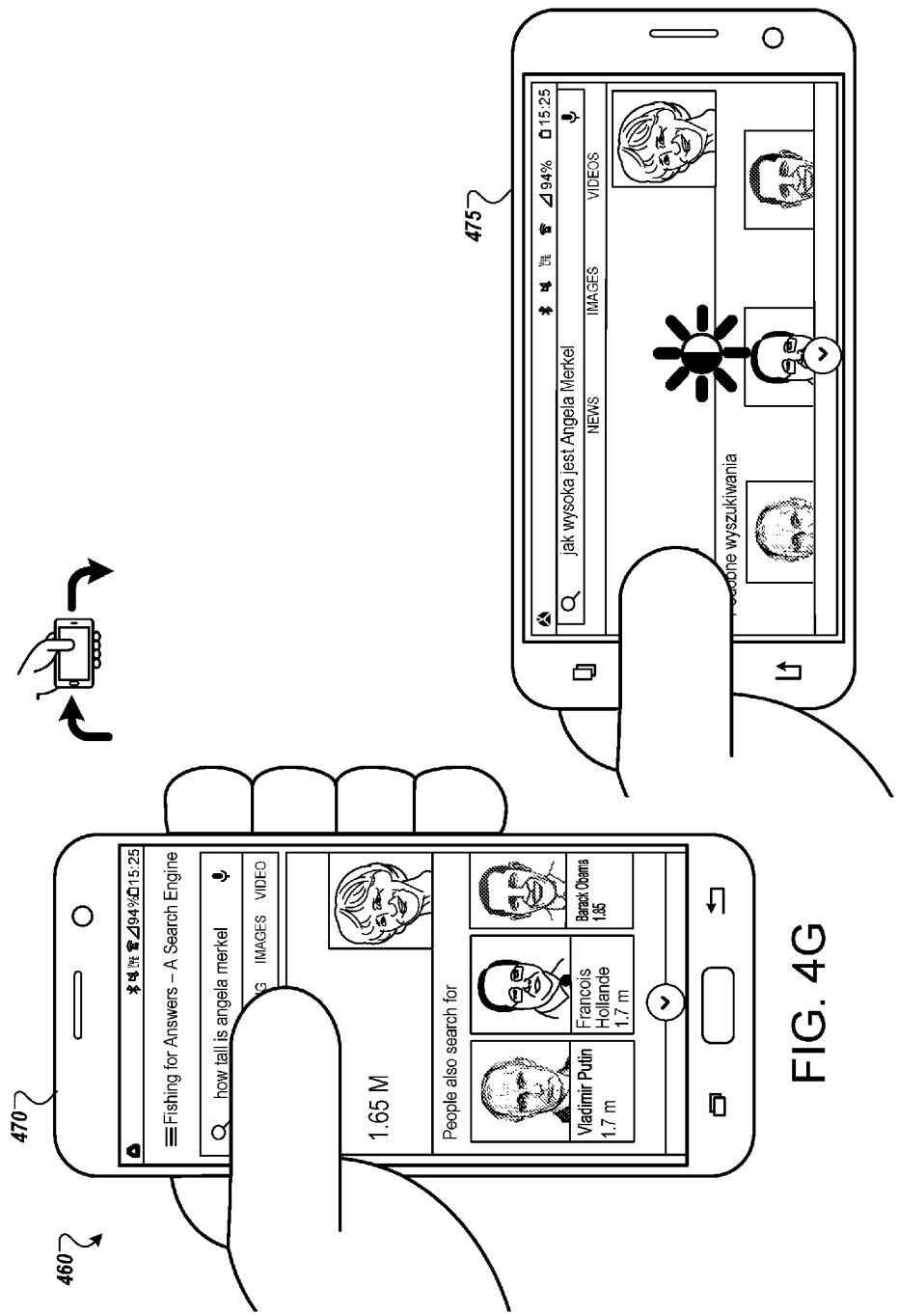

DEVICE-ORIENTATION CONTROLLED SETTINGS

FIELD

This specification relates to the configuration of mobile device settings.

BACKGROUND

Many settings on a mobile phone are generally only available to users within the platform's settings application. Changes to these settings usually apply globally across the phone and any installed applications, and do not reflect the fact that users may wish to temporarily switch settings. Users are often unable to quickly change system-wide settings, such as accessibility settings.

SUMMARY

Users of mobile devices can control settings, such as user interface (UI) language, keyboard language, and search language within their device settings, by changing the orientation of the mobile device. For example, multilingual users cannot easily switch between language settings or see search results in multiple languages with a simple method to switch between the languages. Additionally, some combinations of settings present application developers with problems in understanding a user's intention: default language selection is difficult if a user's platform language is set to one language and their keyboard language is set to another. Detecting a change in orientation of a mobile device or a movement of the mobile device and changing device settings based on the change or movement allows users to quickly switch between settings and more effectively use the device or application on the device.

In one general aspect, a computer-implemented method includes receiving, by a mobile device, a user input, determining, by the mobile device, that the mobile device was oriented in a first orientation when the user input was received, selecting, by the mobile device, one or more first device settings or service request parameters that affect a mobile phone application or a web service experience and that are associated with the first orientation, providing, for output at the mobile device, a first response to the user input that is based at least on the one or more first device settings or service request parameters that affect the mobile phone application or the web service experience and that are associated with the first orientation, after providing the first response to the user input that is based at least on the one or more first device settings or service request parameters that affect the mobile phone application or the web service experience and that are associated with the first orientation, determining, by the mobile device, that the mobile device has been reoriented in a different, second orientation, selecting, by the mobile device, one or more second device settings or service request parameters that affect the mobile phone application or the web service experience and that are associated with the different, second orientation, and providing, for output at the mobile device, a second response to the user input, or to a revision of the user input, that is based at least on the one or more second device settings or service request parameters that affect the mobile phone application or the web service experience and that are associated with the different, second orientation.

Implementations may include one or more of the following features. For example, the different, second orientation can be a 90 degree or 180 rotation with respect to the first orientation. The method can further include determining, by the mobile device, a physical movement of the mobile device; and selecting, by the mobile device, one or more second device settings or service request parameters that affect the mobile phone application or the web service experience and that are associated with the physical movement of the mobile device.

The revision of the user input can be a translation of the user input. The user input can include query terms, and the response can include a search results page. The method can include generating the revision as a candidate revision, and prompting for confirmation that the revision is to be used to generate the second response. The method can include determining whether to generate a revision of the user input, and generating, in response to the determination, the revision of the user input. The determining whether to generate a revision of the user input can be based on a current language setting of the mobile device, a geolocation of the mobile device, or a language of the user input.

The method can include obtaining the second response before the mobile device has been reoriented in the different, second direction. The one or more first device settings or service request parameters that affect a mobile phone application or a web service experience and that are associated with the first orientation and the one or more second device settings or service request parameters that affect a mobile phone application or a web service experience and that are associated with the first orientation can be a device language, accessibility settings, or brightness settings.

The accessibility setting can be a font size. The accessibility setting can be a keyboard language. The one or more first device settings or service request parameters that affect a mobile phone application or a web service experience and that are associated with the first orientation and the one or more second device settings or service request parameters that affect a mobile phone application or a web service experience and that are associated with the first orientation can be a destination server for providing the first response and the second response In another general aspect, a system includes a mobile device having logic that receives a user input, determines that the mobile device was oriented in a first orientation when the user input was received, selects one or more first device settings or service request parameters that affect a mobile phone application or a web service experience and that are associated with the first orientation, provide, for output, a first response to the user input that is based at least on the one or more first device settings or service request parameters that affect the mobile phone application or the web service experience and that are associated with the first orientation, after providing the first response to the user input that is based at least on the one or more first device settings or service request parameters that affect the mobile phone application or the web service experience and that are associated with the first orientation, determine that the mobile device has been reoriented in a different, second orientation, select one or more second device settings or service request parameters that affect the mobile phone application or the web service experience and that are associated with the different, second orientation, and provide, for output, a second response to the user input, or to a revision of the user input, that is based at least on the one or more second device settings or service request parameters that affect the mobile phone application or the web service experience and that are associated with the different, second orientation.

Implementations may include one or more of the following features. For example, the revision of the user input can be a translation of the user input. The user input can include query terms, and the response can include a search results page. The logic can obtain the second response before the mobile device has been reoriented in the different, second direction.

In another general aspect, at least one computer-readable storage medium is encoded with executable instructions that, when executed by at least one processor, cause the at least one processor to perform operations including receiving, by a mobile device, a user input, determining, by the mobile device, that the mobile device was oriented in a first orientation when the user input was received, selecting, by the mobile device, one or more first device settings or service request parameters that affect a mobile phone application or a web service experience and that are associated with the first orientation, providing, for output at the mobile device, a first response to the user input that is based at least on the one or more first device settings or service request parameters that affect the mobile phone application or the web service experience and that are associated with the first orientation, after providing the first response to the user input that is based at least on the one or more first device settings or service request parameters that affect the mobile phone application or the web service experience and that are associated with the first orientation, determining, by the mobile device, that the mobile device has been reoriented in a different, second orientation, selecting, by the mobile device, one or more second device settings or service request parameters that affect the mobile phone application or the web service experience and that are associated with the different, second orientation, and providing, for output at the mobile device, a second response to the user input, or to a revision of the user input, that is based at least on the one or more second device settings or service request parameters that affect the mobile phone application or the web service experience and that are associated with the different, second orientation.

Implementations may include one or more of the following features. For example, the user input can include query terms, and the response includes a search results page. The one or more first device settings or service request parameters that affect a mobile phone application or a web service experience and that are associated with the first orientation and the one or more second device settings or service request parameters that affect a mobile phone application or a web service experience and that can be associated with the first orientation are a device language, accessibility settings, or brightness settings.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 4A-H illustrate example changes in mobile device settings.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
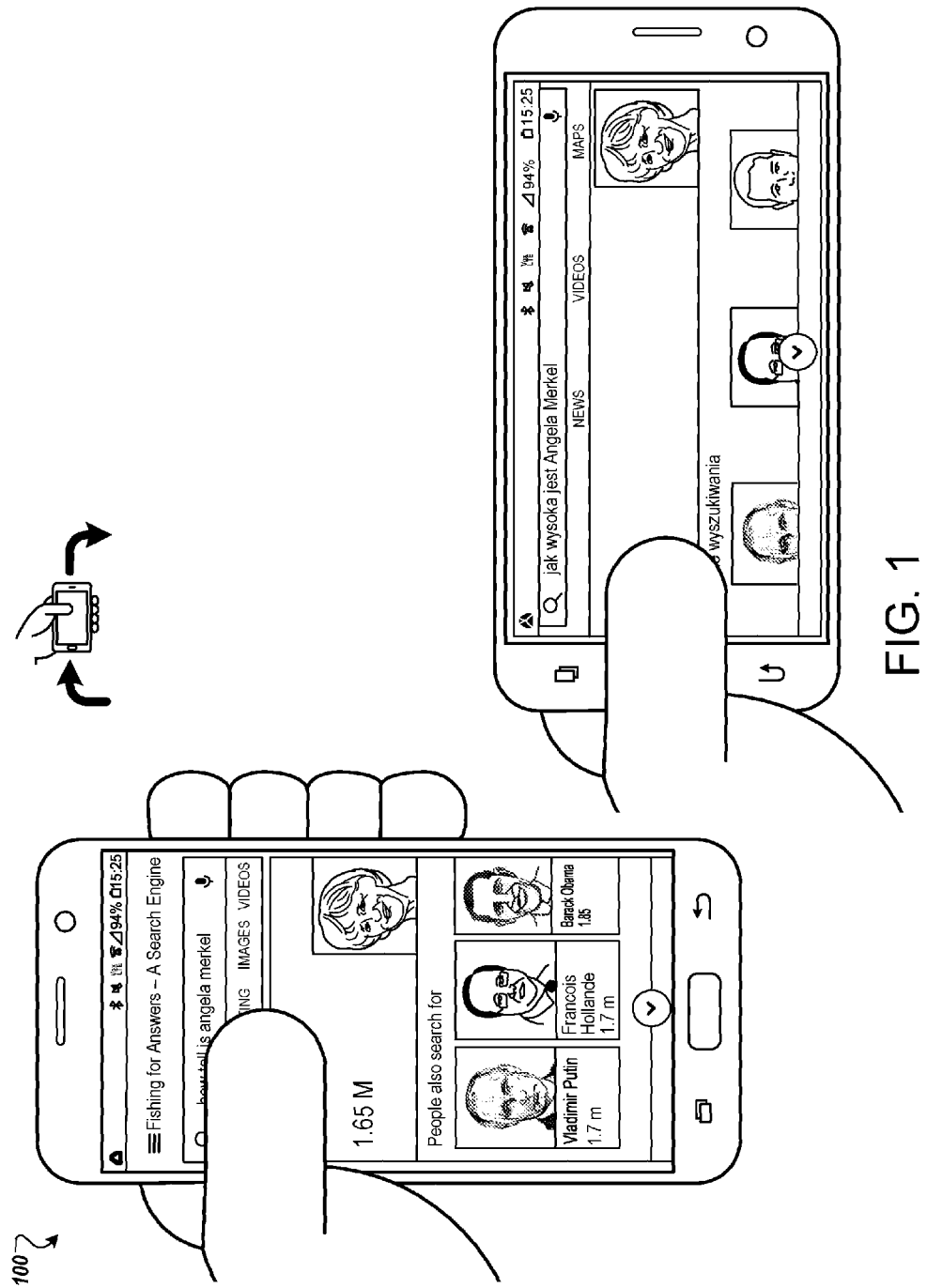
FIG. 1 illustrates an example system for controlling mobile device settings.

FIG. 1 illustrates an example system 100 for controlling mobile device settings. Briefly, according to the illustrated example, a user submits a search query in a first language while holding a mobile device in an upright orientation. Results of the search are presented to the user. The user then reorients the mobile device to an upside down orientation. The upright and upside down orientations of the mobile device are presented as non-limiting examples only. Other orientations or gestures, such as a shaking motion of the mobile device, can be detected and used to effect a change in a device setting. For example, a user can hold the mobile device in landscape orientation and rotate the mobile device to portrait orientation. In some examples, the user can hold the mobile device in a first landscape orientation and rotate the mobile device 180° from the first landscape orientation to a second landscape orientation. In some examples, the user can make a whip-like motion using the mobile device, shake the mobile device, rock the mobile device back and forth, etc. The mobile device can detect the change in orientation or motion and effect a change in a device setting; in this example, the setting is the search language. The submitted search query is revised and resubmitted to the search engine. In this example, the search query is translated to a different, second language. Results of the revised search are presented to the user.

In further detail, the mobile device detects an orientation of the mobile device and can use the orientation to identify a system setting. For example, the mobile device can use default system settings when it is in an upright orientation. The mobile device can share the orientation data with an application. For example, the mobile device can detect that the mobile device itself is in an upright orientation and can send the orientation to a search engine application. The search engine application can receive the data and change the search engine language. If the mobile device detects a change in orientation or a movement, the mobile device can use the updated orientation or movement data to change a system setting. For example, the mobile device can change system-wide font size when it is in an upside down orientation. The mobile device can share the orientation data or motion data with an application. For example, the mobile device can detect that it is in an orientation that is a 90° rotation from its previous orientation, and can send the orientation to a social media application. The social media application can receive the data and change the keyboard language of the mobile device.

The ability to quickly and reliably search in a different language provides bilingual or multilingual users with a better user experience. A user can add one or more secondary languages they wish to access. For example, a user in Thailand who also speaks English may use the English keyboard for a search engine application while their default system language is Thai. The user can experience difficulty obtaining search results in their desired language, and in some examples, can be hindered by the mobile device's platform when attempting to switch languages. For example, device language settings in some mobile device platforms are only accessible through the device's system settings, and can require multiple actions to change.

Search engines can produce different results based on the language in which the search query is submitted, as well as the language the search engine is configured for. Search engines can be configured to respond to queries in particular languages, or be configured to serve search results that resolve to documents or resources in particular languages. For example, an English search engine can be a search engine configured to respond to queries submitted in the English language. In some examples, an English search engine can be configured to serve results to submitted search queries that link to English-language documents.

The same search engine can be, for example, an English search engine and a Chinese search engine by accessing different indices of resources. For example, the same search engine can be an English search engine and present search results that resolve to English-language resources as well as a Polish search engine by responding to search queries submitted in Polish and presenting search results that resolve to Polish-language resources. For example, submitting a query in English to an English search engine can produce a different set of results from the set of results obtained when submitting the same query in English to a Spanish search engine. In some examples, a search query should be submitted to a search engine in a different language. For example, the search query "Yosemite" can be submitted in English to a Chinese search engine, whereas translating "Yosemite" into Chinese and submitting the translated query to the Chinese search engine can produce a different set of results that are less relevant to the user submitting the search query.

Referring to FIG. 1, a user takes out his phone and poses a question: "how tall is Angela Merkel?" The user can type their question or speak their question and the mobile device can use speech recognition to input the user's search query. The question is received by the mobile device as a query.

The search engine application displays the results to "how tall is angela merkel" in English. In this example, all results provided are in English, as is the search engine UI. In some examples, the search results include queries that people who submitted the same search query also submitted. In this example, other users searched for the heights of other world leaders, such as Putin, Hollande, or Barack Obama. These can be suggested search results, or results of searches that are suggested to the user based on the user's current search terms or the user's submitted search query. Each of these results is provided in English, with English units.

The mobile device has access to the user's communications and can access messaging, social media, or other communications applications. The mobile device can scan the user's applications and content to determine the user's primary language, or the user's default preference for a particular setting. For example, the mobile device can scan the user's communications and determine that the user's primary language is English. In some examples, the mobile device can determine the user's primary language by accessing the user's keyboard language settings or system-wide settings. For example, the mobile device can detect that the user has the English keyboard installed, and set the user's primary language as English.

The mobile device can determine an alternate language or setting. For example, the mobile device can determine that the user also communicates in Polish, and set the alternate language to Polish. In some examples, if the default language is not English, the mobile device can set the alternate language to English.

The mobile device can scan the user's communications and determine that the user also communicates with certain contacts in German and set the user's alternate language as German. In some examples, the user has more than one keyboard installed, and the mobile device can detect which keyboards the user has installed. For example, the mobile device can detect that the user has the English and Chinese keyboards installed, and that the user communicates in English for a majority of the time. The mobile device can then set English as the user's primary language and set Chinese as the user's alternate language.

In some examples, the mobile device can determine the user's language preferences by analyzing the user's search history. For example, the mobile device can detect that the user has recently been searching for plane tickets to Munich and important phrases to learn in German. The mobile device can then set the user's alternate language as German.

The user can change or override the settings determined by the mobile device at any time. For example, if the user is learning French, but uses English primarily and German often, the user can set the alternate language to French instead of German.

In some examples, the mobile device allows for multiple alternate settings. For example, the mobile device can allow a user to assign three different languages to different orientations of the mobile device: an upright orientation can be associated with English, an upside down orientation can be associated with Russian, and either landscape orientation can be associated with Japanese. The mobile device can allow the user to choose various numbers of alternate languages associated with various orientations of the mobile device.

In some examples, the mobile device can detect the user's geographical location and use the location to determine system settings to change. In some examples, the user's geographical location is detected using the Global Positioning System (GPS). In some examples, the user's geographical location is detected using the Mobile Country Code (MCC) for a mobile network to while the mobile device is connected. In some examples, the user's location is used to change language settings when the user is in a region with significant regional variation in language, such as India, Belgium, etc.

In some examples, the user's location is used to change language settings automatically when a user is travelling. For example, if the user is on vacation in the United States, the mobile device can detect that the user is currently in an English-speaking country, and set the alternate keyboard as English, replacing the user's usual alternate keyboard language of Farsi. The user can then submit search queries in English, allowing them to submit searches they wouldn't normally search for, such as "Yellowstone," "Yosemite," and "the Big Apple," without being directed to unrelated search results in Arabic. In some examples, the search engine language remains in the user's default search engine language. For example, the user can search for American attractions on an Arabic search engine, such that the search results are presented in the user's first language, which is Arabic in this example.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The user, deciding they would like to see search results run in their second language, Polish, then turns the phone upside down. The mobile device can detect that its orientation was changed, and alert the search engine application of the change. The search engine application then displays results for "jak wysoka jest Angela Merkel." In this example, the search engine UI is still in English. The results are provided in Polish, as are the units. The names of each of the results searched for by other users who searched for Angela Merkel's height have also been translated into Polish, as has the header denoting the suggested search results.

In some examples, the mobile device detects the user's alternate language preference and the search engine application submits two search queries—one in each language. The two queries can be submitted at the same time and the separate sets of results can be obtained before the user changes orientation of the mobile device. The set of results in the alternate language can then be displayed immediately after the change in orientation is detected, reducing latency and allowing the user to switch between results quickly.

In some examples, the search query is automatically translated into the user's alternate language. In some examples, the user is prompted to enter a translation of the search query. For example, a dialog box can be presented to the user to provide a translation of their search query into their alternate language, as there can be subtleties not carried over in a machine translation. In some examples, the user is prompted to accept a proposed translation. For example, a dialog box can be presented to the user that includes a proposed translation of the user's search query.

In some examples, the user is prompted to select an alternate language. For example, the user can associate multiple alternate languages with the same orientation of the mobile device. A dialog box can be presented to the user to select which of the alternate languages the user would like to translate their search query into.

In some examples, the user has not provided an alternate language, and no alternate language has been detected by the mobile device. For example, the user only has the English keyboard, and has set English as their only UI language. The mobile device can detect that the user is in an English-speaking country, and the user only communicates in English. A dialog box can be presented to the user to select an alternate language.

In some examples, a list of suggested alternate languages can be presented based on the most commonly used alternate languages. In some examples, a list of suggested alternate languages can be presented based on the user's previous search activity, the user's contacts, etc. For example, if a plurality of the user's friends use Spanish as their alternate language, Spanish can appear as the first suggestion. In some examples, the mobile device can detect the user's proximity to certain landmarks, contacts, etc. to provide language suggestions. For example, if the user is near Little Italy in New York City, Italian can appear as a suggested alternate language.

In some examples, the search engine application submits the user's search query in the default language when it is received, and submits the translation of the user's search query in the alternate language when the mobile device detects a change in orientation and informs the search engine application.

The set of results for the translated search query can then be displayed upon retrieval. In some examples, the set of results for the original search query are retained, allowing the user to change orientations and view the previous set of results. For example, the user can change their mind and decide they want to view the results for how tall Angela Merkel is in English again, and turn the mobile device over again.

In some examples, the set of results can be presented in the alternate language initially. For example, if the user holds the mobile device upside down and turns the mobile device on upside down, the device UI can display search results in the user's alternate language immediately.

Figure 2:
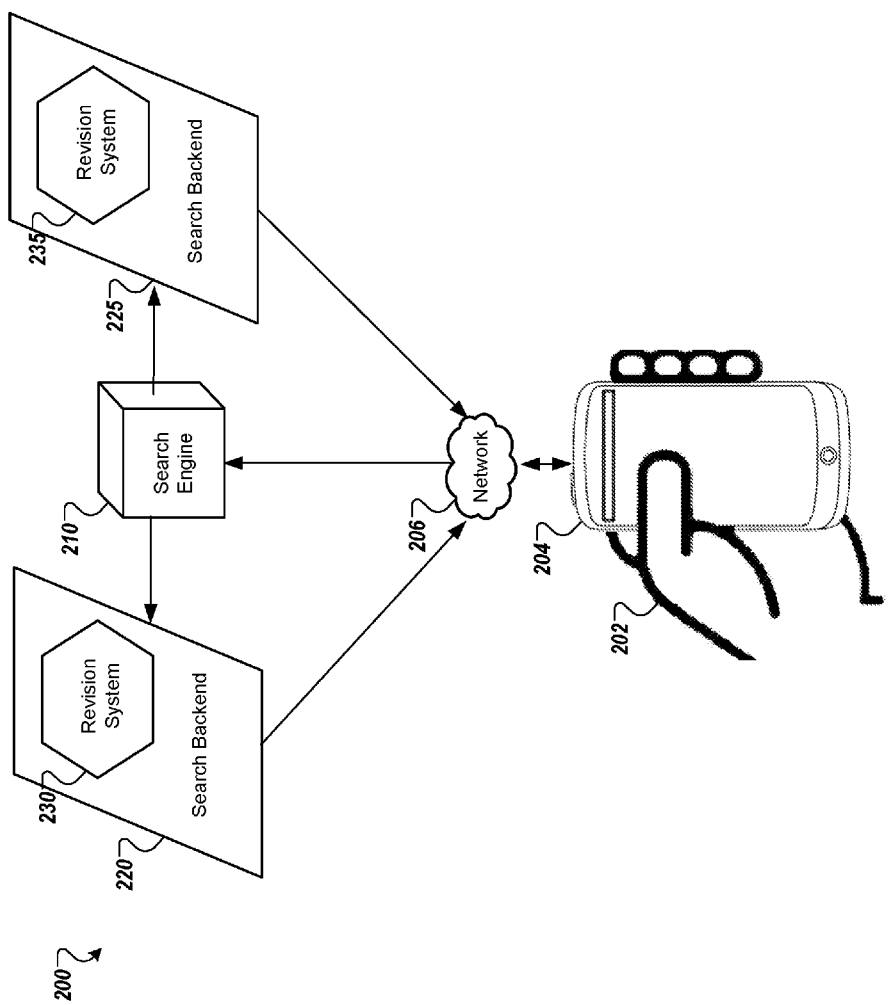
FIG. 2 illustrates an example system for controlling mobile device settings as the device submits a search query.

FIG. 2 illustrates an example system 200 for controlling mobile device settings as the device submits a search query. The system 200 represents a system that may be used to perform the process described with respect to FIG. 1. Briefly, according to an example, a user submits a query to a mobile device, which sends the query to a search engine through a network. The search engine sends the query to two separate search back-ends, which process the search query. Each search back-end can be configured to process search queries differently. For example, one search back-end can be configured to process search queries using an English knowledge base, while a different search back-end can be configured to process search queries using a Polish knowledge base. A knowledge base is built based on processing of various local data, including: previously typed text, received notifications, on-screen content, sensor data, etc., as well as collections of data sourced from remote data sources, such as the World Wide Web. Each search back-end has a revision system. The revision systems process the queries which are processed by the search back-ends. The resulting queries are sent to a search engine. The results from the search engine are presented to the user through the mobile device.

The system 200 includes a mobile device 204 that submits the query to search engine 210 through a network 206. The mobile device 204 can be various mobile device, such as personal digital assistants, cellphones, smartphones, and other similar computing devices. In this example, the mobile device 204 is a smartphone. The components shown here, their connections and relationships, and their functions, are meant to be exemplary only, and are not meant to limit the implementations described and/or claimed in this document.

The mobile device 204 is in communication with the network 206 through various forms of connections, such as WiFi, Ethernet, and other appropriate connection media. The search engine 210, as well as the search back-ends 220 and 225, are communicably coupled to the network 206, and can communicate with the network 206 through communications protocols or protocol families such as TCP/IP, IPX/SPX, X.25, and other appropriate communications protocols or protocol families. The network 206 can communicate with the mobile device 204 using previously mentioned communications protocols or protocol families.

The mobile device 204 can detect a change in orientation or a motion of the mobile device 204. In some examples, the mobile device 204 detects a change in orientation or motion based on sensor data from sensors such as gyroscopes, accelerometers, magenetometers, light sensors, etc. For example, the mobile device 204 can detect a change in orientation from a portrait orientation to a landscape orientation or a shaking motion based on orientation data from a gyroscope or an accelerometer. In some examples, the mobile device 204 can detect a change in orientation based on an angle of orientation. In some examples, the mobile device 204 detects a change in orientation based on a threshold change in angle. For example, the mobile device 204 can determine that the user 202 is changing the orientation of the mobile device if a change of over 30° in orientation is detected. In some examples, the mobile device 204 detects a change in orientation based on a rate of change of angle.

The mobile device 204 can detect a change in orientation or motion of the mobile device 204 based on a change in acceleration from accelerometer data. For example, the mobile device 204 can detect a shaking motion of the mobile device 204 based on a rapidly oscillation in acceleration. In some examples the mobile device 204 can detect a change in orientation based on a change in acceleration. For example, the mobile device 204 can detect a change in orientation from a landscape orientation to a different landscape orientation based on a change in acceleration.

In some examples, the mobile device 204 can detect a change in orientation or a motion of the mobile device 204 based on sensor data from a camera of the mobile device 204. For example, the mobile device 204 can detect a change in orientation based on a change in image data from a camera of the mobile device 204. In some examples, the mobile device 204 can detect a change in orientation or a motion of the mobile device 204 based on optical flow data, explicit indication from the user 202, etc. For example, the user 202 can provide input through a user interface element to indicate a change in orientation of the mobile device 204.

The search engine 210, processes revised queries to produce an answer to the revised queries. In this particular example, the search engine 210 is named Fishing for Answers—A Search Engine. In some examples, the search engine 210 can be any search engine available to the user 202. The search engine 210 can be a software system designed to search for information on the World Wide Web. The search engine 210 uses processes such as web crawling, indexing, and other appropriate processes to search for answers to received queries. Results from the search engine 210 can be presented to the user 202 as pages of results.

The search engine 210 transmits search queries to search back-ends. The search back-ends 220 and 225 can include servers, applications, and/or databases. Back-end technology represents the data access layer of software between the hardware and an end user, such as a user 202. Back-end software manages databases of information used in and input from a front end, or the portion of software having an interface with which a user interacts. Each search back-end processes a submitted search query differently. For example, the search back-end 220 can process a search query using an English knowledge base, while the search back-end 225 can process a search query using a Polish knowledge base. In some examples, fewer or more than two search back-ends can be used. For example, one search back-end can process multiple queries and send each to a different revision system. The search back-ends 220 and 225 each include revision systems, e.g., revision systems 230 and 235.

The revision systems 230 and 235 are query rewrite systems that revise or annotate queries. In some examples, the revision systems 230 and 235 attach notes or keywords to queries to expand the query, narrow the query, redirect the query, rewrite the query, etc. In some examples, the revision systems 230 and 235 revise received queries by rewriting them. For example, the revision systems 230 and 235 can receive a query of "Where should I go for dinner?", determine that the query is asking about restaurant recommendations, and rewrite the query as "restaurants, dinner."

In some examples, the revision systems 230 and 235 rewrite queries by translating the queries. For example, the revision systems 230 and 235 can receive a query of "how tall is angela merkel," determine that a second language to translate the query into is Polish, and rewrite the query as "jak wysoka jest Angela Merkel."

In some examples, the revision systems 230 and 235 process the same query differently. For example, the user 202 can submit a query of "German forests" to search back-ends 220 and 225. The search back-ends 220 and 225 can determine that one query is to remain in English, while the other query is to be translated into German. The search back-ends 220 and 225 can submit the queries to the revision systems 230 and 235. In some examples one search back-end, such as the search back-end 210 will not revise the query "German forests," while another search back-end, such as the search back-end 215 will translate the query "German forests" to "Deutsch Wälder."

In some examples, fewer or more than two revision systems can be used. For example, the search back-ends can process three queries and provide each query to a different revision system. In some examples, one revision system can process two queries and provide the revised queries to a search engine.

In some examples, the query is sent to both of the search back-ends 220 and 225 at once. For example, the query can be sent to both an English and a Polish search back-end of the search engine 210 as soon as the query is received. By sending the query to both search back-ends initially and storing results for the alternate language, the system 200 can reduce latency when switching between results in the default language and the alternate language.

In some examples, the query is sent to the search back-end corresponding to the user's default setting first, and the query is sent to the search back-end corresponding to the user's alternate setting when the mobile device 204 detects that it has been reoriented. For example, the user 202 submits the query "how tall is angela merkel" and the query is submitted to a search back-end corresponding to the user 202's default language, English. Once the user 202 turns the mobile device 204 upside down, the mobile device 204 detects that it has been reoriented and submits the translated query "jak wysoka jest Angela Merkel" to a search back-end corresponding to the user 202's alternate language, Polish.

Upon finding an answer to a query, the search back-ends 220 and 225 present the results to the user 202 through the mobile device 204. The search back-ends 220 and 225 can transmit the search results to the mobile device 204 through the network 206. The result can include more than one result to the query. For example, if the search engine 210 is a website search engine, the result can provide one or more pages of results. In some examples, the search engine 210 is a local search engine, or a website search engine that only produces one result.

Figure 3:
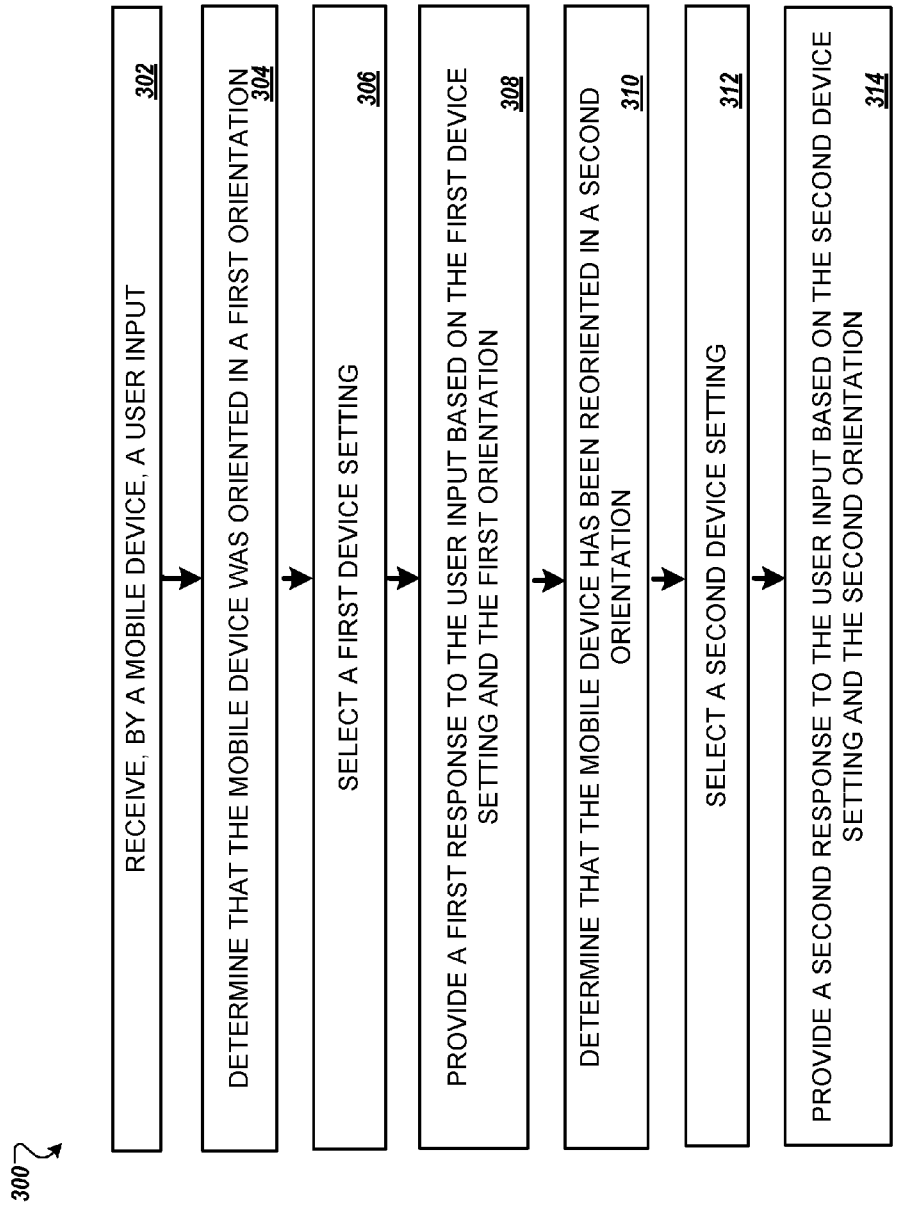
FIG. 3 is a flowchart illustrating an example process that controls the settings of a mobile device.

FIG. 3 is a flowchart illustrating an example process that controls the settings of a mobile device. Briefly, according to an example, the process 300 includes receiving, by a mobile device, a user input (302). For example, the user 202 can input the query "how tall is angela merkel" to the mobile device 204.

The process 300 includes determining that the mobile device was oriented in a first orientation (304). For example, the mobile device 204 can determine that it was being held right side up by the user 202 when the user 202 submitted the query "how tall is angela merkel." The process 300 continues by selecting a first device setting (306). The mobile device 204 can selecting one or more first device settings or service request parameters that affect a mobile phone application or a web service experience and that are associated with the first orientation. For example, the mobile device 204 can determine that a default language for the mobile device 204 is English. The mobile device 204 can use English as the UI language, displaying text in English and providing the user 202 with an English keyboard. The device settings can be any setting, such as a UI language or keyboard language, a screen brightness, an accessibility setting, a font size, etc. For example, the mobile device 204 can determine that a default font size for the mobile device 204 is 9 pt. The mobile device 204 can use 9 pt. font to display all text controlled by the mobile device 204.

The process 300 continues by providing a first response to the user based on the first device setting and the first orientation (308). For example, the mobile device 204 can provide, for output at the mobile device 204, search results to the query "how tall is angela merkel" in English.

The process 300 continues by determining that the mobile device has been reoriented in a second orientation (310). For example, after providing the search results in English, the user 202 can decide that they want see the search results in Polish, and turn the mobile device 204 upside down. The mobile device 204 can determine that it has been turned upside down. The process 300 continues by selecting a second device setting (312). For example, the mobile device 204 can select Polish as the new language in which to display the search results for "how tall is angela merkel."

In some examples, the second device setting is a second set of service request parameters that affect a mobile phone application on the mobile device 204 or a web service experience and is associated with the second orientation. In some examples, the first and/or second device settings or service request parameters include additional device settings or service request parameters, different device settings or service request parameters, and/or removed device settings or service request parameters. For example, the second device setting can be a removal of the "large font" setting on the mobile device 204.

In some examples, the first and/or second device settings or service request parameters include application settings. For example, the first device setting can be a language setting for a particular search application on the mobile device 204 that does not affect the settings for the rest of the applications or services on the mobile device 204.

In some examples, the user 202 provides the second device setting to the mobile device 204. For example, the user 202 can set their secondary language as Polish. In some examples, the mobile device 204 can determine a second device setting. For example, the mobile device 204 can scan the user 202's communications and determine that the user 202 communicates in English and Polish. The mobile device 204 can determine that, because the default language is English, the secondary language is Polish.

In some examples, the second device setting is a change to the first device setting. For example, the user 202 can decide that they want to change their default language to German. The user 202 can turn the mobile device 204 upside down and change the default UI language for the mobile device 204 to German.

The process 300 concludes by providing a second response to the user input based on the second device setting and the second orientation (314). For example, the mobile device 204 can provide search results for the query "how tall is angela merkel" in Polish. In some examples, the query can be translated into the secondary language and resubmitted to the search engine. In this example, the query "how tall is angela merkel" is translated from English to Polish: "jak wysoka jest Angela Merkel," and is resubmitted to the search engine 210. In some examples, the search engine 210 uses the same search back-end to process the query. For example, the queries "how tall is angela merkel" and "jak wysoka jest Angela Merkel" can both be run on the English version of the search engine 210.

In some examples, the mobile device 204 can determine whether to apply the settings. For example, if a user submits the query "how tall is angela merkel," the mobile device 204 can determine whether to translate "angela merkel," which is a name. In some examples, the mobile device 204 presents the user 202 with a confirmation dialog. For example, the mobile device 204 can present the user 202 with a pop-up that asks for the user 202's input on whether they would like their query or a particular part of their query translated. In some examples, the mobile device 204 can determine whether to present the confirmation dialog. For example, the mobile device 204 can access user history to determine that the user 202 generally never translates names—the mobile device 204 can determine that it should stop presenting the confirmation dialog when names are present.

Figures 4A, 4B:
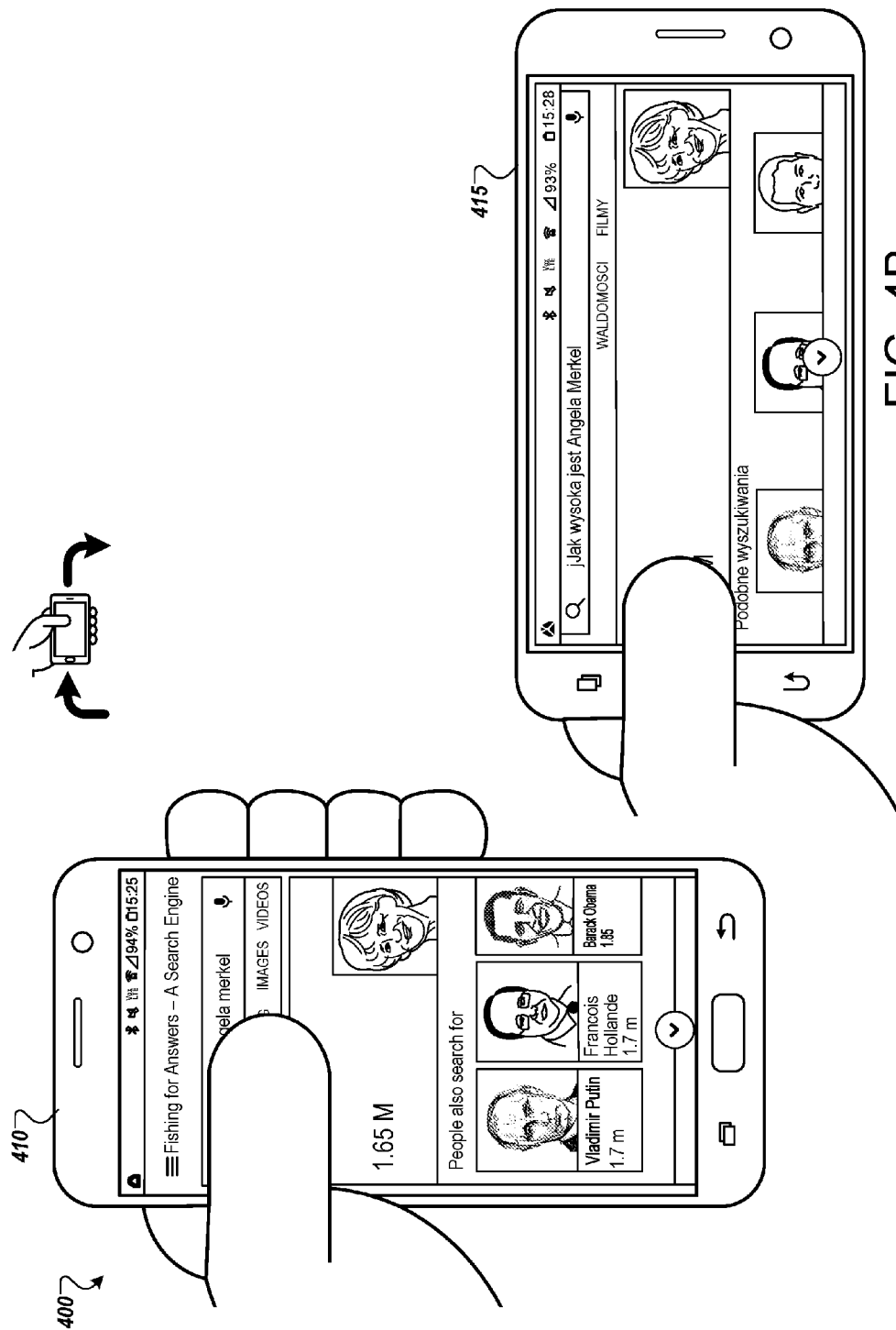

FIGS. 4A-B illustrate example changes in mobile device settings. The system 400 represents a system that may be used to perform the process described with respect to FIG. 1. Briefly, according to an example, a user can submit a query to a mobile device and receive search results in one language. The user can rotate the mobile device to see results run in a different language, on a different search back-end.

In some examples, the user-submitted query, submitted in one language, can be translated into the secondary language and resubmitted to the search engine (e.g., the search engine 210). In this example, the query "how tall is angela merkel" is submitted to a search engine, such as search engine 210 of FIG. 1. The default language of the mobile device (e.g., the mobile device 204) can be English, and the search query can be run on the English version of the search engine 210.

When the user (e.g., the user 202) wants to see search results for the submitted query in a different language, the user 202 can rotate the mobile device 204. In this example, the user 202's secondary language for the mobile device 204 is Polish. The second device setting can be applied to the search query, and in this example, the search query can be processed in the secondary language. For example, the query can be translated from English to Polish: "jak wysoka jest Angela Merkel," and resubmitted to the search engine 210. In some examples, the search engine 210 uses a different search back-end from the search back-end used to process the unrevised query. For example, the query "how tall is angela merkel" can be run on the English version of the search engine 210 and "jak wysoka jest Angela Merkel" can be run using the search back-end that accesses a Polish knowledge base.

FIG. 4A illustrates example interface 410 displaying search results for the user-submitted query in the default language for the mobile device 204. In this example, the default language is English, and the query, the search results, and the search UI are displayed in English.

FIG. 4B illustrates example interface 415 displaying search results for the user-submitted query in the secondary language for the mobile device 204. In this example, the secondary language is Polish, and the query, the search results, and the search UI are displayed in Polish.

FIGS. 4C-D illustrate example changes in mobile device settings. The system 420 represents a system that may be used to perform the process described with respect to FIG. 1. Briefly, according to an example, a user can submit a query to a mobile device and receive search results in one language. The user can rotate the mobile device to see results run in the same language, on a different search back-end.

In some examples, the user-submitted query, submitted in one language, can be resubmitted to the search engine (e.g., the search engine 210). In this example, the query "jak wysoka jest Angela Merkel" is submitted to a search engine, such as search engine 210 of FIG. 2. The default language of the mobile device (e.g., the mobile device 204) can be Polish, and the search query can be run on the Polish version of the search engine 210.

When the user (e.g., the user 202) wants to see search results for the submitted query on a different search back-end, the user 202 can rotate the mobile device 204. In this example, the user 202's secondary language for the mobile device 204 is English. The second device setting can be applied to the search query, and in this example, the search query can be processed in the default language and submitted to a search back-end in the secondary language. For example, the query "jak wysoka jest Angela Merkel" can be resubmitted to the search engine 210. In some examples, the search engine 210 uses a different search back-end from the search back-end used to process the query the first time. For example, the query "jak wysoka jest Angela Merkel" can be run on the Polish version of the search engine 210, or using the search back-end that accesses a Polish knowledge base, and can be run a second time on the English version of the search engine 210, or using the search back-end that accesses an English knowledge base.

FIG. 4C illustrates example interface 430 displaying search results for the user-submitted query in the default language for the mobile device 204. In this example, the default language is Polish, and the query, the search results, and the search UI are displayed in Polish.

FIG. 4D illustrates example interface 435 displaying search results for the user-submitted query in the secondary language for the mobile device 204. In this example, the secondary language is English, and the search UI is displayed in English, while the query and the results are displayed in Polish.

In some examples, the user 202 can submit a query using a first device setting and the mobile device 204 can detect that a second device setting should be used. For example, the user 202 can submit a query "jak wysoka jest Angela Merkel," which is in Polish, to the English version of the search engine 210. The mobile device 204 can detect that the user 202 entered a query in their secondary language, and can run the submitted search query using a search back-end in the secondary language upon detecting rotation of the mobile device 204.

In some examples, the mobile device 204 can automatically process a user input according to a second device setting upon detecting that the input does not match a first device setting. In some examples, the mobile device 204 can process the user input according to the second device setting upon detecting a rotation or physical motion of the mobile device 204 that triggers a re-processing of the user input.

FIGS. 4E-F illustrate example changes in mobile device settings. The system 440 represents a system that may be used to perform the process described with respect to FIG. 1. Briefly, according to an example, a user can submit a query to a mobile device and receive search results. The user can rotate the mobile device to see results in a larger font.

In some examples, when the user (e.g., the user 202) wants to see search results for the submitted query in a larger font, the user 202 can rotate the mobile device 204. In this example, the font size of the mobile device 204 is changed to be larger. The mobile device 204 displays the search results for the submitted query in the new font size. In some examples, the second font size is set by the user 202. In some examples, the second font size is selected by the mobile device 204. For example, the second font size can be determined based on the amount of text displayed, the type of content, etc.

FIG. 4E illustrates example interface 450 displaying search results for the user-submitted query in the default font size for the mobile device 204. FIG. 4F illustrates example interface 455 displaying search results for the user-submitted query in the secondary font size for the mobile device 204. In this example, the secondary font size is larger than the default font size.

Any number of various accessibility settings can be used as the device settings that affect the mobile phone application or the web service experience of the user 202. In this example, the accessibility setting is the font size of the mobile device 204 UI. In some examples, accessibility settings include inverted colors, voiceover (reading text aloud), other text formatting options (such as bolding), image contrast, UI appearances (e.g., button size, button shape, animations, etc.), etc.

FIGS. 4G-H illustrate example changes in mobile device settings. The system 440 represents a system that may be used to perform the process described with respect to FIG. 1. Briefly, according to an example, a user can submit a query to a mobile device and receive search results. The user can rotate the mobile device to see results displayed using a higher screen brightness.

In some examples, when the user (e.g., the user 202) wants to see search results for the submitted query using a higher screen brightness, the user 202 can rotate the mobile device 204. In this example, the brightness of the screen of the mobile device 204 is increased. The mobile device 204 displays the search results for the submitted query using the new screen brightness. In some examples, the second screen brightness is set by the user 202. In some examples, the second screen brightness is selected by the mobile device 204. For example, the second screen brightness can be determined based on the type of content displayed, the time of day, the amount of ambient light, etc.

FIG. 4G illustrates example interface 470 displaying search results for the user-submitted query using a default screen brightness for the mobile device 204. FIG. 4H illustrates example interface 475 displaying search results for the user-submitted query using the secondary screen brightness for the mobile device 204.

In some examples, the changing of settings based on the orientation of the device can be disabled. For example, if the user 202 is reading a map, or looking at images, the user 202 can disable, or temporarily disable, changing the font size of the UI of the mobile device 204. In some examples, the user 202 can selectively disable the feature. For example, the user 202 can decide to disable switching languages when the current language is German. In some examples, the mobile device 204's UI language can still be changed when the current language is another language, such as English.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
receiving, by a mobile device, a search query;
providing the search query to a search engine;
in response to providing the search query to the search engine, obtaining from the search engine a first set of search results responsive to the search query in a first language and a second set of search results responsive to the search query translated into a second language that is different than the first language;
determining, by the mobile device, that the mobile device was oriented in a first orientation when the user input was received;
after receiving the second set of search results responsive to the search query translated into the second language and in response to determining, by the mobile device, that the mobile device was oriented in the first orientation when the user input was received, providing, for output at the mobile device, the first set of search results responsive to the search query in the first language;
after providing the first set of search results responsive to the search query in the first language, determining, by the mobile device, that the mobile device has been reoriented in a different, second orientation;
in response to determining, by the mobile device, that the mobile device has been reoriented in the different, second orientation, providing, for output at the mobile device, the second set of search results responsive to the search query translated into the second language that is different than the first language.

2. The method of claim 1, wherein the different, second orientation is a 90 degree or 180 rotation with respect to the first orientation.

3. The method of claim 1, wherein the search query comprises query terms in the first language, and each set of search results comprises a search results page.

4. The method of claim 1, wherein the second language that the search query is translated into is based on a current language setting of the mobile device, a geolocation of the mobile device, or a language of the user input.

5. The method of claim 1, wherein the second set of search results is obtained before the mobile device has been reoriented in the different, second direction.

6. The method of claim 1, wherein the search engine is configured to access different indices corresponding to resources in corresponding languages based on a language of a search query.

7. The method of claim 1, wherein the first set of search results are provided in a first search results page that is in the first language and the second set of search results are provided in a second search results page that is in the second language.

8. A system comprising:
one or more computers and one or more storage devices storing instructions that are operable, when executed by the one or more computers, to cause the one or more computers to perform operations comprising:
receiving, by a mobile device, a search query;
providing the search query to a search engine;
in response to providing the search query to the search engine, obtaining from the search engine a first set of search results responsive to the search query in a first language and a second set of search results responsive to the search query translated into a second language that is different than the first language;
determining, by the mobile device, that the mobile device was oriented in a first orientation when the user input was received;
after receiving the second set of search results responsive to the search query translated into the second language and in response to determining, by the mobile device, that the mobile device was oriented in the first orientation when the user input was received, providing, for output at the mobile device, the first set of search results responsive to the search query in the first language;
after providing the first set of search results responsive to the search query in the first language, determining, by the mobile device, that the mobile device has been reoriented in a different, second orientation;
in response to determining, by the mobile device, that the mobile device has been reoriented in the different, second orientation, providing, for output at the mobile device, the second set of search results responsive to the search query translated into the second language that is different than the first language.

9. The system of claim 8, wherein the different, second orientation is a 90 degree or 180 rotation with respect to the first orientation.

10. The system of claim 8, wherein the search query comprises query terms in the first language, and each set of search results comprises a search results page.

11. The system of claim 8, wherein the second language that the search query is translated into is based on a current language setting of the mobile device, a geolocation of the mobile device, or a language of the user input.

12. The system of claim 8, wherein the second set of search results is obtained before the mobile device has been reoriented in the different, second direction.

13. The system of claim 8, wherein the search engine is configured to access different indices corresponding to resources in corresponding languages based on a language of a search query.

14. The system of claim 8, wherein the first set of search results are provided in a first search results page that is in the first language and the second set of search results are provided in a second search results page that is in the second language.

15. A non-transitory computer-readable medium storing instructions executable by one or more computers which, upon such execution, cause the one or more computers to perform operations comprising:
receiving, by a mobile device, a search query;
providing the search query to a search engine;
in response to providing the search query to the search engine, obtaining from the search engine a first set of search results responsive to the search query in a first language and a second set of search results responsive to the search query translated into a second language that is different than the first language;

determining, by the mobile device, that the mobile device was oriented in a first orientation when the user input was received;

after receiving the second set of search results responsive to the search query translated into the second language and in response to determining, by the mobile device, that the mobile device was oriented in the first orientation when the user input was received, providing, for output at the mobile device, the first set of search results responsive to the search query in the first language;

after providing the first set of search results responsive to the search query in the first language, determining, by the mobile device, that the mobile device has been reoriented in a different, second orientation;

in response to determining, by the mobile device, that the mobile device has been reoriented in the different, second orientation, providing, for output at the mobile device, the second set of search results responsive to the search query translated into the second language that is different than the first language.

16. The medium of claim 15, wherein the different, second orientation is a 90 degree or 180 rotation with respect to the first orientation.

17. The medium of claim 15, wherein the search query comprises query terms in the first language, and each set of search results comprises a search results page.

18. The medium of claim 15, wherein the second language that the search query is translated into is based on a current language setting of the mobile device, a geolocation of the mobile device, or a language of the user input.

19. The medium of claim 15, wherein the second set of search results is obtained before the mobile device has been reoriented in the different, second direction.

20. The medium of claim 15, wherein the search engine is configured to access different indices corresponding to resources in corresponding languages based on a language of a search query.

* * * * *